(12) United States Patent
Kikuchi et al.

(10) Patent No.: US 10,491,801 B2
(45) Date of Patent: Nov. 26, 2019

(54) FOCUSING DEVICE, CAMERA SYSTEM, AND FOCUSING METHOD

(71) Applicant: Olympus Corporation, Hachioji-shi, Tokyo (JP)

(72) Inventors: Tetsuo Kikuchi, Hachioji (JP); Kazumasa Kunugi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/820,400

(22) Filed: Nov. 21, 2017

(65) Prior Publication Data

US 2018/0146131 A1 May 24, 2018

(30) Foreign Application Priority Data

Nov. 24, 2016 (JP) .................................. 2016-228318

(51) Int. Cl.
*H04N 5/232* (2006.01)
*G02B 7/28* (2006.01)
*H04N 5/225* (2006.01)
*G02B 7/36* (2006.01)

(52) U.S. Cl.
CPC ........... *H04N 5/23212* (2013.01); *G02B 7/28* (2013.01); *G02B 7/36* (2013.01); *H04N 5/2252* (2013.01); *H04N 5/232122* (2018.08); *H04N 5/232123* (2018.08); *H04N 5/232939* (2018.08)

(58) Field of Classification Search
CPC ......... H04N 5/23212; H04N 5/232939; H04N 5/232123; H04N 5/232122; H04N 5/2252; G02B 7/28; G02B 7/36
See application file for complete search history.

(56) References Cited

U.S. PATENT DOCUMENTS

| 205,869 A | * | 7/1878 | Keighton | ............... B65D 27/08 |
|---|---|---|---|---|
| | | | | 229/72 |
| 2009/0086083 A1 | * | 4/2009 | Kunishige | ............... G03B 13/32 |
| | | | | 348/345 |

FOREIGN PATENT DOCUMENTS

| JP | 8-160288 | 6/1996 |
| JP | 2006-325194 | 11/2006 |

* cited by examiner

*Primary Examiner* — Twyler L Haskins
*Assistant Examiner* — Fayez Bhuiyan
(74) *Attorney, Agent, or Firm* — John C. Pokotylo; Pokotylo Patent Services

(57) ABSTRACT

A focusing device includes at least one circuit which controls a first focusing operation using a contrast detection scheme, a second focusing operation using a phase detection scheme, and a setting operation to set a limited range. The circuit is configured to, in the first focusing operation, obtain a contrast evaluation value for positions of a focus lens within the limited range and a predetermined range beyond the limited range, and control a focusing operation based on the obtained contrast evaluation value, and in the second focusing operation, determine an out-of-focus state if a focal position of the focus lens based on a calculated defocus amount is outside the limited range or outside a first limited range having a boundary outside the limited range.

13 Claims, 8 Drawing Sheets

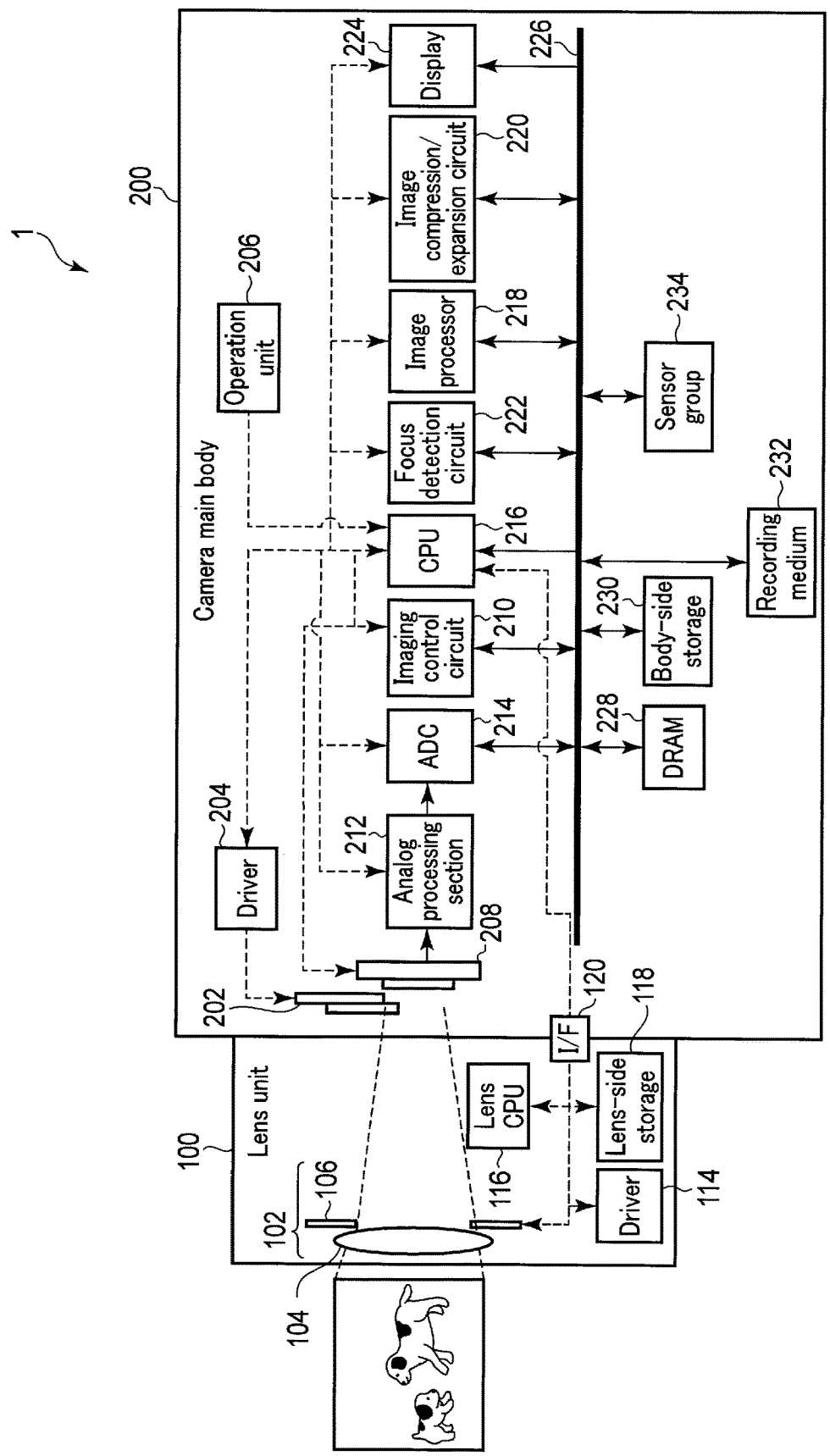
F I G. 1

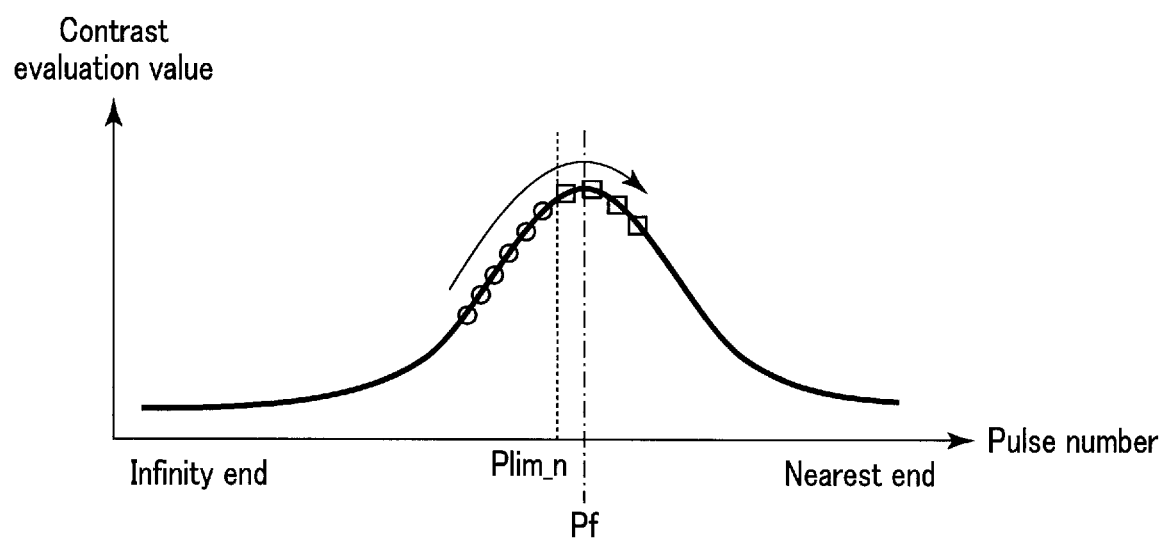
F I G. 5

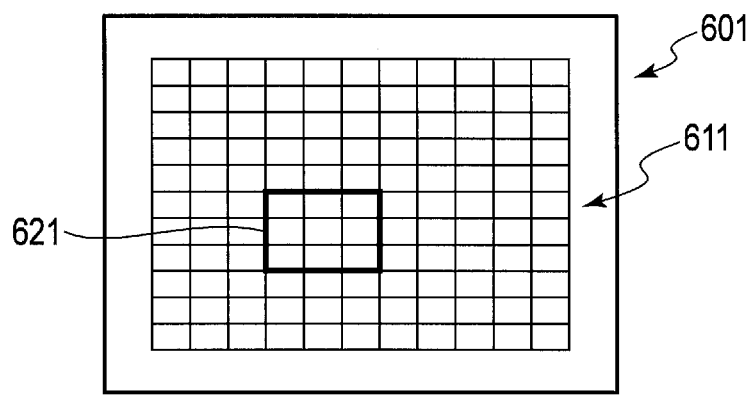
F I G. 7
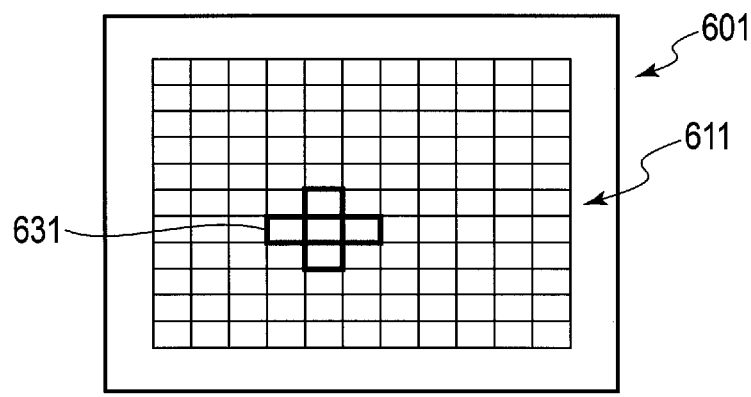
F I G. 8
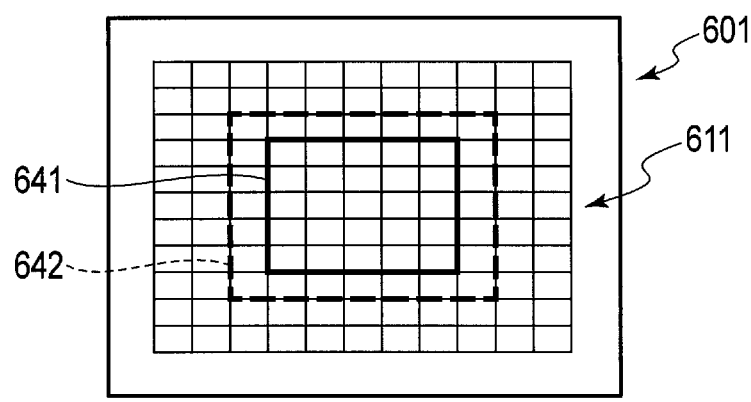
F I G. 9

FOCUSING DEVICE, CAMERA SYSTEM, AND FOCUSING METHOD

CROSS-REFERENCE TO RELATED APPLICATIONS

This application is based upon and claims the benefit of priority from prior Japanese Patent Application No. 2016-228318, filed Nov. 24, 2016, the entire contents of which are incorporated herein by reference.

BACKGROUND OF THE INVENTION

1. Field of the Invention

The present invention relates to a focusing device, a camera system, and a focusing method.

2. Description of the Related Art

An auto-focus function in cameras, for determining a focus state and moving a lens unit's focus lens to focus on a subject, has been generally known. For various reasons, such an auto-focus function is adapted to limit a focusing range within the focusable range from the nearest end to the infinity end determined according to optical characteristics of a lens. This is disclosed in, for example, Jpn. Pat. Appln. KOKAI Publication No. 8-160288 and Jpn. Pat. Appln. KOKAI Publication No. 2006-325194.

Known auto-focusing schemes include a contrast detection scheme that searches for a focal position based on changes in contrast in taken subject images, and a phase detection scheme that calculates a focal position through the detection of a phase difference using, for example, sensors in an image sensor. When limiting a range for moving a focus lens, the contrast detection scheme and the phase detection scheme may be based on a different relationship between the limited range and the processing involved.

BRIEF SUMMARY OF THE INVENTION

According to an aspect of the invention, a focusing device to control a focusing operation of a lens unit which moves a focus lens to adjust a focal position comprises an operation device which receives an input indicative of a range for moving the focus lens as a limited range; and at least one circuit which controls a first focusing operation using a contrast detection scheme to obtain a focal position of the focus lens based on a contrast evaluation value of an object image, a second focusing operation using a phase detection scheme to obtain a focal position of the focus lens based on a defocus amount calculated from a phase difference, and a setting operation to set the limited range. The at least one circuit is configured to, in the first focusing operation, obtain the contrast evaluation value for positions of the focus lens within the limited range and a predetermined range beyond the limited range, and control the focusing operation based on the obtained contrast evaluation value, and in the second focusing operation, determine an out-of-focus state if the focal position of the focus lens based on the calculated defocus amount is outside the limited range or outside a first limited range having a boundary outside the limited range.

According to an aspect of the invention, a camera system comprises a camera main body comprising the focusing device; and the lens unit. The camera main body comprises a first communication unit for connection to the lens unit. The lens unit comprises the focus lens, a lens circuit which outputs information for designating the limited range, a position detector which detects the position of the focus lens, and a second communication unit for connection to the camera main body. The camera main body and the lens unit are configured to exchange information via the first communication unit and the second communication unit. The at least one circuit of the focusing device obtains, via the first communication unit, the information for designating the limited range from the lens circuit and the position information from the position detector.

According to an aspect of the invention, a focusing method for controlling a focusing operation of a lens unit which moves a focus lens to adjust a focal position comprises (i) determining a range for moving the focus lens as a limited range; (ii) under a contrast detection scheme to obtain a focal position of the focus lens based on a contrast evaluation value of an object image, obtaining the contrast evaluation value for positions of the focus lens within the limited range and a predetermined range beyond the limited range, and controlling the focusing operation based on the obtained contrast evaluation value; and (iii) under a phase detection scheme to obtain a focal position of the focus lens based on a defocus amount calculated from a phase difference, determining an out-of-focus state if the focal position of the focus lens based on the calculated defocus amount is outside the limited range or outside a first limited range having a boundary outside the limited range.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an overview of a configuration example of a camera system according to one embodiment.

FIG. 5 is a diagram for explaining an example of the relationship between a pulse number and a contrast evaluation value involved in contrast detection AF processing.

FIG. 7 is a diagram for explaining an example of a group target that targets 9 AF areas.

FIG. 8 is a diagram for explaining an example of a group target that targets 5 AF areas.

FIG. 9 is a diagram for explaining AF areas targeted in the case of all targets.

DETAILED DESCRIPTION OF THE INVENTION

Figure 2:
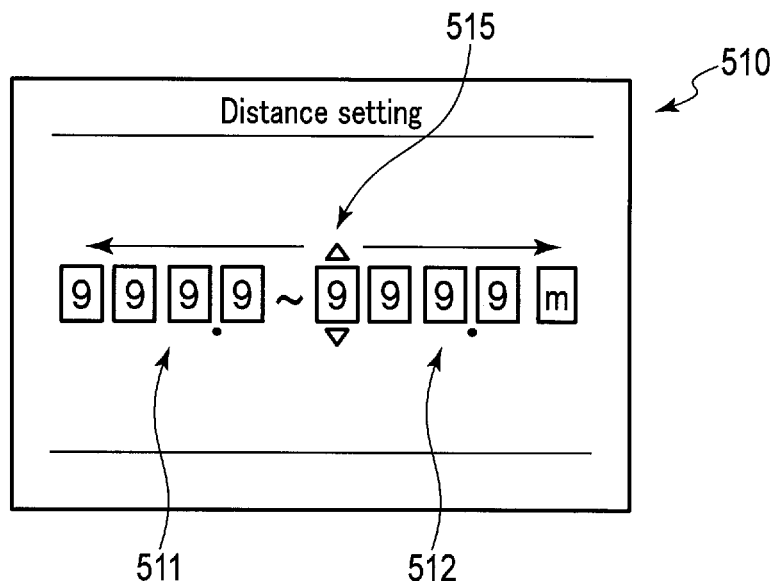
FIG. 2 schematically shows an example of a setting view displayed when focus limits according to one embodiment are set.

Certain embodiments of the present invention will now be described with reference to the accompanying drawings. A camera system according to one embodiment performs focusing operations to adjust a focal point by determining a focus state and moving a focus lens of a lens unit. For the focusing operations, the camera system according to this embodiment includes an auto-focus (AF) function based on two schemes. Specifically, the camera system includes an AF function that utilizes a contrast detection scheme and a phase detection scheme. During contrast detection AF that uses the contrast detection scheme, the camera system searches for a focal position based on changes in contrast in taken subject images. During phase detection AF that uses the phase detection scheme, the camera system calculates a focal position through the detection of a phase difference using sensors in an image sensor. The camera system according to this embodiment further includes a so-called focus limit function for limiting a focusing range, as a limited range, within the focusable range from the nearest end to the infinity end determined according to optical characteristics of a lens.

[Configurations of Camera System]

FIG. 1 is a block diagram showing an overview of a configuration example of a camera system 1 that represents one example of an imaging apparatus according to one embodiment of the invention. In FIG. 1, solid lines with arrows indicate the flow of data, and broken lines with arrows indicate the flow of control signals.

The camera system 1 includes a lens unit 100 and a camera main body 200. The lens unit 100 is adapted for the attachment to the camera main body 200. When the lens unit 100 is attached to the camera main body 200, they are connected to each other so that control signals can be sent and received through a communication unit. The camera system 1 is not required to be of an interchangeable lens camera. For example, the camera system 1 may be of a fixed lens camera.

The lens unit 100 includes an imaging lens 102, a driver 114, a lens CPU 116, and a lens-side storage 118.

The imaging lens 102 is an optical system for forming object light fluxes into an image on a later-described image sensor 208 of the camera main body 200. The imaging lens 102 includes a lens 104 and an aperture 106. The lens 104 comprises a focus lens adapted to move in an optical axis direction to adjust the focal position of the imaging lens 102. The aperture 106 is disposed on the optical axis of the lens 104 and adapted to vary its opening diameter. The aperture 106 adjusts object light fluxes passing through the lens 104 and entering the image sensor 208. The driver 114 changes the position of the lens 104 and the opening diameter of the aperture 106 based on control signals from the lens CPU 116. The imaging lens 102 may be formed as a zoom lens, and in this case, the driver 114 also performs zoom driving. The driver 114 may function as a position detector to detect the position of the focus lens. The position of the focus lens is controlled using the detected position information. In this embodiment, the position of the focus lens is managed using pulse numbers.

The lens CPU 116 is adapted to communicate with a later-described CPU 216 of the camera main body 200 via an interface (I/F) 120 as the communication unit. The lens CPU 116 may function as a focus controller to control the driver 114 under the control of the CPU 216. Also, the lens CPU 116 sends information, such as an aperture value (F number) of the aperture 106 and lens information stored in the lens-side storage 118, to the CPU 216 via the I/F 120.

The lens-side storage 118 stores the lens information for the lens unit 100. The lens information includes, for example, focal length information of the imaging lens 102 and aberration information.

The camera main body 200 includes a mechanical shutter 202, a driver 204, an operation unit 206, the image sensor 208, an imaging control circuit 210, an analog processing section 212, an analog-to-digital converter (ADC) 214, the CPU 216, an image processor 218, an image compression/expansion circuit 220, a focus detection circuit 222, a display 224, a bus line 226, a DRAM 228, a body-side storage 230, a recording medium 232, and a sensor group 234.

The mechanical shutter 202 is adapted to open and close to adjust the incidence time of object light fluxes from an object onto the image sensor 208 (exposure period of the image sensor 208). As the mechanical shutter 202, a focal plane shutter may be employed, for example. The driver 204 drives the mechanical shutter 202 based on control signals from the CPU 216.

The operation unit 206 includes various operational buttons such as a power button, a release button, a movie button, a play button, and a menu button, as well as various operational components such as a touch panel. The CPU 216 obtains the operational state of each operational component in the operation unit 206.

The image sensor 208 is disposed behind the mechanical shutter 202 on the optical axis of the imaging lens 102, and at the position where the imaging lens 102 forms an image from object light fluxes. The image sensor 208 includes two-dimensionally arranged light receivers (for example, photodiodes) that constitute pixels. The light receivers of the image sensor 208 each generate an electric charge corresponding to the amount of received light. The electric charges generated from the light receivers are accumulated in capacitors connected to the respective light receivers. The electric charges accumulated in the capacitors are read as pixel signals based on control signals from the imaging control circuit 210. In this embodiment, the image sensor 208 includes focus detection pixels for detecting a phase difference. For example, some of the two-dimensionally arranged light receivers are partially shielded and form pairs. Based on output signals from these pair-forming light receivers, a phase difference is detected and a focus deviation amount (defocus amount) is calculated.

The imaging control circuit 210 controls exposure of the image sensor 208 and reading of pixel signals from the image sensor 208, in accordance with the setting for reading pixel signals from the image sensor 208.

The analog processing section 212 performs analog processing such as amplification processing to the pixel signals read from the image sensor 208 under the control of the imaging control circuit 210. The ADC 214 converts the pixel signals output from the analog processing section 212 into digital pixel data. In the following descriptions, a set of pixel data may be called image data.

The image processor 218 applies various image processing to the image data. For example, to record a still image, the image processor 218 applies image processing for recording still images. Similarly, to record a moving image, the image processor 218 applies image processing for recording moving images. Furthermore, to display live views, the image processor 218 applies image processing for display.

To record image data, the image compression/expansion circuit 220 compresses the image data (still image data or moving image data) generated by the image processor 218. To reproduce image data, the image compression/expansion circuit 220 expands the image data recorded in the recording medium 232 in a compressed state.

The focus detection circuit 222 performs defocus amount calculation to derive a defocus direction and a defocus amount with respect to the focal position of the lens 104. In the phase detection AF mode, the focus detection circuit 222 acquires pixel data from the focus detection pixels in the image sensor 208 and calculates, based on the acquired pixel data, a defocus direction and a defocus amount with respect to the focal position of the lens 104 using the known phase difference scheme. The focus detection circuit 222 then calculates, based on the defocus direction and the defocus amount, the lens position to which the lens 104 should be driven. In the contrast detection AF mode, the focus detection circuit 222 calculates contrast evaluation values and derives, based on the change in the obtained contrast evaluation values, a defocus direction with respect to the focal position of the lens 104. The focus detection circuit 222 then calculates, based on the defocus direction, the lens position to which the lens 104 should be driven.

The CPU 216 is a controller that performs overall control of the camera system 1 based on a program or programs stored in the body-side storage 230. This control includes focusing operations that follow prescribed focusing methods. The CPU 216 in cooperation with the focus detection circuit 222 also functions as a focusing device. Additionally, functions realized by the CPU 216 include a function to serve as a setting unit for setting a range for moving the focus lens, as a limited range, in the implementation of the focus limit function.

The CPU 216 communicates with the lens unit 100 via the I/F 120, where various control signals are exchanged between the CPU 216 and the lens unit 100. This communication includes the CPU 216 as a position acquisition unit acquiring the position information of the focus lens detected by the driver 114 functioning as a position detector, the CPU 216 sending control signals for operating the focus lens to the lens CPU 116, and so on.

The display 224 is a display device such as a liquid crystal display or an organic EL display, and is disposed at, for example, the back of the camera main body 200. This display 224 displays images under the control of the CPU 216. The display 224 is used for displaying live views, recorded images, etc.

The bus line 226 is connected to the imaging control circuit 210, the ADC 214, the CPU 216, the image processor 218, the image compression/expansion circuit 220, the focus detection circuit 222, the display 224, the DRAM 228, the body-side storage 230, the recording medium 232, and the sensor group 234, and functions as a transfer path for transferring various data generated in these blocks.

The DRAM 228 is an electrically rewritable memory, and temporarily stores various data including the aforementioned image data (pixel data), image data for recording, image data for display, processing data in the CPU 216, etc. An SDRAM may also be employed for transitory storage.

The body-side storage 230 stores various data such as programs used in the CPU 216, adjustment values for the camera main body 200, etc.

The recording medium 232 is embedded in or adapted to be insertable into the camera main body 200, and records the image data for recording as image files of a predetermined format.

The sensor group 234 includes any sensors necessary for detecting the orientation of the camera main body 200, its motion, position, azimuth, and so on. For example, the sensor group 234 may include an acceleration sensor, a barometer, a gyro sensor, a magnetic sensor, a GPS sensor, etc.

The imaging control circuit 210, the image processor 218, the image compression/expansion circuit 220, the focus detection circuit 222, etc. may each or in any combination be constituted by one or more integrated circuits such as application specific integrated circuits (ASICs), or field programmable gate arrays (FPGA).

[Operations of Camera System]

The camera system 1 according to the embodiment includes the AF modes as mentioned above, i.e., the contrast detection AF mode and the phase detection AF mode. Which of the contrast detection AF mode and the phase detection AF mode should be used may be determined in any manner. For example, the phase detection AF mode may be applied to a continuous AF (CAF) mode which is a mode to continuously change a focal position and which is used when dealing with a moving subject, sequentially shooting still images, or the like. The contrast detection AF mode may be applied to a single AF (SAF) mode which is a mode to fix a focal position upon establishing an in-focus state and which is used when dealing with a stationary subject, or the like. Also, the phase detection AF mode and the contrast detection AF mode may be switched with each other based on a user designation, or based on imaging scenes determined according to a subject by a scene determination unit.

The camera system 1 according to this embodiment includes a focus limit function for limiting a range to focus during AF operations, as a limited range, in accordance with, for example, user designation. With the limited focusing range, it is possible to perform quick focusing, to prevent focusing that is not desired by a user, and so on.

The camera system 1 includes items to set the focus limits as a setting menu. When a user selects a focus limit setting from setting options, the display 224 presents a setting view 510 which is, for example, as shown in FIG. 2. The setting view 510 includes a near-side limit setting indication 511 and a far-side limit setting indication 512. The near-side limit setting indication 511 includes an indication of a multi-digit numerical value in metric units as a near-side limit. The far-side limit setting indication 512 includes an indication of a multi-digit numerical value in metric units as a far-side limit. The setting view 510 also includes a change target indication 515. A position of the change target indication 515 is at the position of either of these numerical value indications, and indicates which numerical value of the near-side limit setting indication 511 and the far-side limit setting indication 512 is being selected for user operations. The numerical value designated by the change target indication 515 is changed according to user operations with the operation unit 206. In this manner, the near-side limit and the far-side limit are input by a user, and the limited range from the near-side focus limit to the far-side focus limit is set in the camera system 1. Additionally, the camera system 1 may be adapted so that a user can easily turn on and off the focus limit function by, for example, using one of the operation buttons on the operation unit 206.

Figure 3:
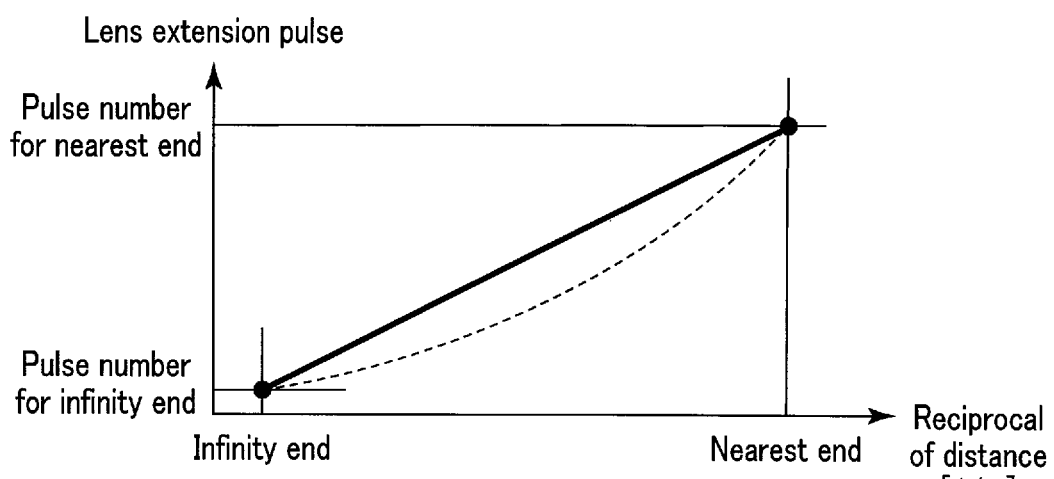
FIG. 3 is a diagram for explaining an example of the relationship between a reciprocal of distance and lens extension pulses involved in the control of a focus lens position.

As described above, a user sets the focus limits in terms of distance (metric units). On the other hand, the camera system 1 controls the focus lens position using the number of lens extension pulses. As such, the distance information set by a user needs to be converted into a lens extension pulse number. Accordingly, a conversion such as the following may be performed, but is not limited to this. FIG. 3 shows the relationship between a reciprocal of distance and lens extension pulses. To be precise, a reciprocal of distance and lens extension pulses show a non-linear relationship as depicted by the broken curve in FIG. 3. To cope with this, linear approximation as depicted by the solid line in FIG. 3 will be assumed. In this instance, based on a distance Ds set by a user, the pulse number Pno corresponding to the set distance can be obtained by:

$$Pno=Pdif(1/Ds)/(1/Dn)+Pf,$$

where Pdif is a difference between the pulse number for the nearest end and the pulse number for the infinity end, Dn is a distance of the nearest end, and Pf is the pulse number for the infinity end.

The case of setting the focus limits according to user operations has been described as an example. However, the focus limit setting is not limited to this. For example, a focus limit switch may be provided to the lens unit 100 so that it can switch whether a predetermined focus limit is set or not. In this instance, upon turning on the focus limit switch, the lens CPU 116 of the lens unit 100, functioning as a range outputting unit, outputs focus limit information to the CPU 216 of the camera main body 200. This focus limit information may include information indicating that the focus limits are applied, as well as information on the distance or the pulse number as the information to specify a limited range. The CPU 216 uses such information to control the operations for the focus limits as in the case of setting focus limits based on user operations through the menu display.

If the setting from the focus limit switch at the lens unit 100 differs from the focus limit setting from the menu display, the setting from the focus limit switch may be prioritized. This priority assumes that the setting action using the focus limit switch at the lens unit 100 is easier than the setting action using the menu display. Note that the focus limit switch may be furnished on the camera main body 200, or the camera main body 200 may be configured that a switch provided in the camera main body 200 can be allocated to a function of the focus limit switch.

<Contrast detection AF Processing>

Figure 4:
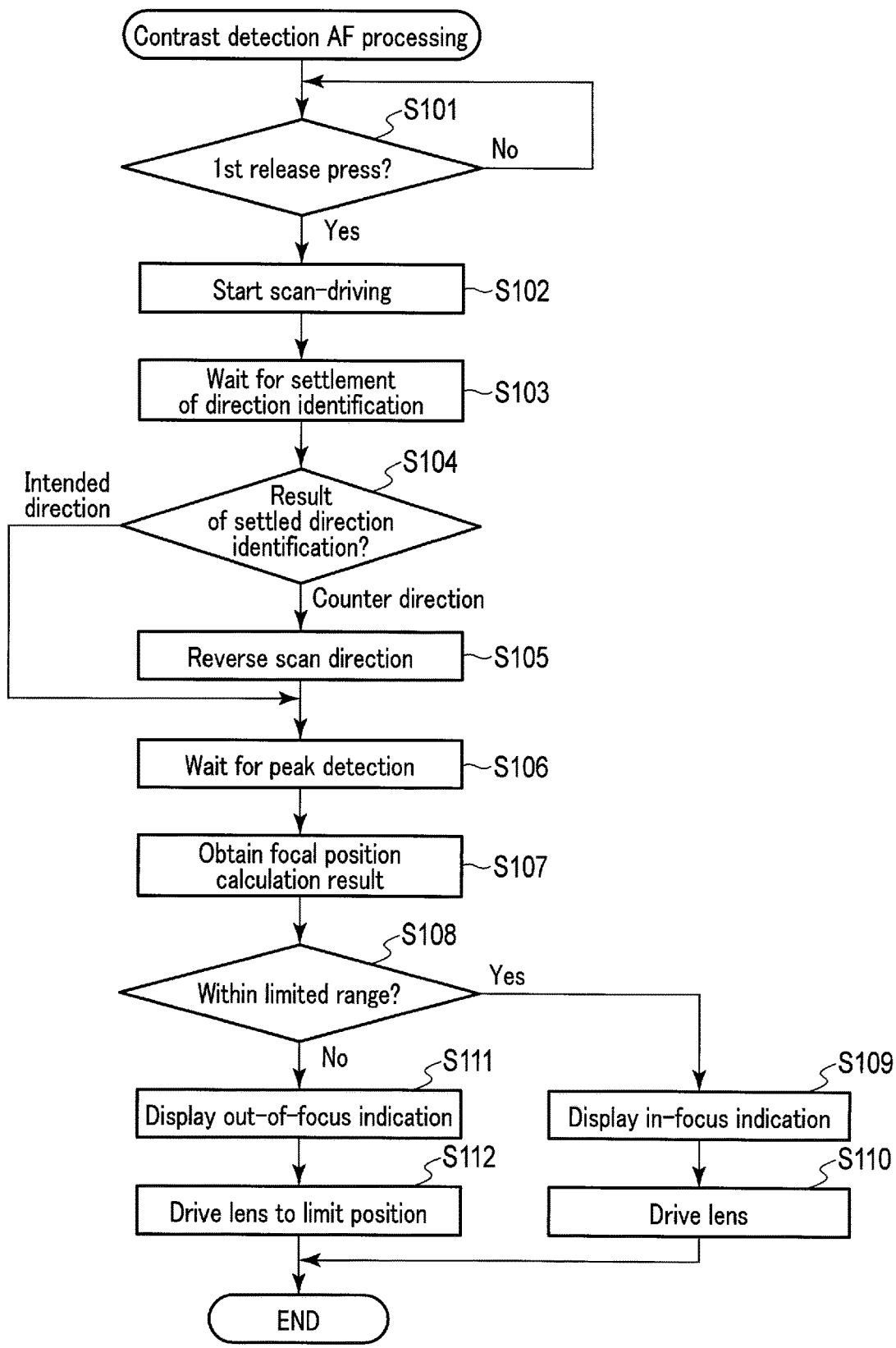
FIG. 4 is a flowchart schematically showing an example of contrast detection AF processing according to one embodiment.

Focusing operations of the camera system 1 in the contrast detection AF mode will be described with reference to the flowchart of FIG. 4. The operations shown in the flowchart of FIG. 4 are performed when, for example, the contrast detection AF mode is selected and the release button formed as a 2-stage button is pressed halfway (i.e. 1st release press). Specifically, in step S101, the CPU 216 determines whether or not the 1st release press is done. Unless the 1st release press is done, the processing repeats step S101 to stand by. If the 1st release press is done, the processing flow advances to step S102.

In step S102, the CPU 216 starts scan-driving the focus lens where the focus lens is moved to gradually change the focusing position. Specifically, the CPU 216 determines a traveling rate of the focus lens based on the F number, focal length, etc. of the focus lens. The CPU 216 determines whether the focus lens is currently on the far side or the near side. If the focus lens is currently on the far side, the CPU 216 determines that the focus lens will be moved in a direction toward the near side. If the focus lens is currently on the near side, the CPU 216 determines that the focus lens will be moved in a direction toward the far side. The CPU 216 sends an instruction to operate the focus lens to the lens CPU 116, thereby scan-driving the focus lens.

In step S103, the CPU 216 waits for the settlement of a direction identifying operation. Specifically, the CPU 216 acquires calculation results from the focus detection circuit 222, and stands by until the contrast evaluation value shows an increase or a decrease by a certain value or greater. When the contrast evaluation value has increased or decreased by the certain value or greater, the processing flow advances to step S104.

In step S104, the CPU 216 determines whether the result from the settled direction identifying operation is an intended direction or a counter direction. Here, the CPU 216 determines the result to be the intended direction if the contrast evaluation value is increasing, and determines the result to be the counter direction if the contrast evaluation value is decreasing. If the result is determined to be the counter direction, the processing flow advances to step S105. In this step S105, the CPU 216 stops driving the focus lens for the moment, reverses the direction of driving the focus lens, and drives the focus lens in the opposite direction. The processing flow then advances to step S106. If, in step S104, the result from the direction identifying operation is determined to be the intended direction, the processing flow skips to step S106. That is, the focus lens is kept driven in the same direction as determined in step S102.

In step S106, the CPU 216 waits for the focus detection circuit 222 to detect a peak of the contrast evaluation value. For example, since the contrast evaluation value is now increasing thanks to the direction identification in step S104, etc., the focus detection circuit 222 recognizes the detection of the peak when the contrast evaluation value consecutively decreases for certain frames or more after the contrast evaluation value has passed the maximum value. The number of frames involving the consecutive decrease of the contrast evaluation value may be 2, for example. Such a so-called climbing AF operation is performed, and the lens is continuously driven (scan-driven) during the period for searching for a focal position. Upon recognizing the detection of the peak, the processing flow advances to step S107.

In step S106, during scan-driving, it is determined for each frame if the lens position is yet to reach the infinity end or the nearest end. Specifically, the CPU 216 obtains position information for the lens position of the focus lens from the lens unit 100. This information includes an end-point indicator flag that changes its value when the lens position reaches the infinity end or the nearest end. By checking this end-point indicator flag, the CPU 216 determines whether or not the lens position has reached the infinity end or the nearest end.

In step S106, if the focus limit function is on during the scan-driving, it is determined if the lens position has not yet reached the focus limit position. The specific processing is as follows. The focus limit positions are managed by the lens extension pulse number, as described above. In order to reliably locate the contrast peak within the limited range between the near-side focus limit and the far-side focus limit, in particular the contrast peak close to the focus limit, the camera system 1 continues driving the focus lens and determining the contrast evaluation value for predetermined frames after the lens position has passed the focus limit position. The scan-driving is continued beyond the focus limit position because the contrast detection AF (climbing AF) requires detecting whether or not there has been a peak by letting the lens position overrun the focal position. To this end, the number of such predetermined frames after the focus limit position may be set to 4, for example.

FIG. 5 shows one example of the relationship between a pulse number and a contrast evaluation value in the contrast detection AF. Contrast evaluation values in FIG. 5 are obtained while the lens position undergoes scan-driving from the far side toward the near side. In FIG. 5, the position indicated by the dotted line, Plim_n, is assumed to be the focus limit position on the nearest-end side. Also, the position indicated by the dashed-dotted line, Pf, is assumed to be the focal position. In this example, the contrast evaluation values, which are gradually increasing as indicated by the circle marks, are obtained during the scan-driving before reaching the focus limit indicated by the dotted line. Furthermore, in the example the scan-driving and the acquisition of contrast evaluation values are continued for 4 frames beyond the focus limit position as indicated by the square marks.

The range for the scan-driving is determined, for example, in the following manner. The far-side end of the scan-driving range, located 4 frames beyond the corresponding focus limit position, will be denoted as Ps_f [pulse]. Using the far-side focus limit position Plim_f [pulse] and the traveling rate V [pulse/frame] of the lens position, the scanning far-side end Ps_f [pulse] is determined by:

$$Ps\_f = Plim\_f - V \times 4.$$

The near-side end of the scan-driving range, located 4 frames beyond the corresponding focus limit position, will be denoted as Ps_n [pulse]. Using the near-side focus limit position Plim_n [pulse] and the traveling rate V [pulse/frame] of the lens position, the scanning near-side end Ps_n [pulse] is determined by:

$$Ps\_n = Plim\_n + V \times 4.$$

In this embodiment, the operations follow in step S107 and onward, as will be described below. When a peak of the contrast evaluation values is correctly detected within the scan-driving range between the scanning near-side end and the scanning far-side end, the focus detection circuit 222 calculates a focal position. If the calculated focal position consequently falls outside the limited range between the respective focus limits, the focus detection circuit 222 determines an out-of-focus state. In this manner, the continuous scan-driving beyond the focus limit position also allows for the detection of a peak of contrast evaluation values that is close to the focus limit. If no peak can be detected after exceeding the scan-driving range, the focus detection circuit 222 determines an out-of-focus state. When an out-of-focus state is determined, the CPU 216 causes the display 224 to display information indicative of the out-of-focus state, stops the movement of the focus lens, and terminates the contrast detection AF processing.

Determining whether or not the calculated focal position falls outside the limited range for determining an out-of-focus state may be done, for example, in the following manner. For the calculated focal position Pf [pulse], a repetitive determination margin M [pulse] will be used. If either the relationship:

$$Pf < Plim\_f - M, \text{ or}$$

$$Pf > Plim\_n + M,$$

where Plim_f is a far-side focus limit position [pulse] and Plim_n is a near-side focus limit position [pulse], is satisfied, the out-of-focus state is determined.

The repetitive determination margin M is a margin to avoid, for example, an event in which an error, etc. causes variation in the in-focus state determination or the out-of-focus state determination, even when completely identical imaging scenes are handled while the focal position as a target of search is present in the vicinity of a focus limit. For example, the repetitive determination margin may be set to 1Fδ when all the following conditions are met.

(1) An in-focus state has been determined in the last AF operation.

(2) The last focal position has fallen within ±1Fδ from the focus limit position.

(3) The imaging scene has not been changed.

If any of the conditions (1) to (3) are not met, the repetitive determination margin is set to 0Fδ.

In the condition (3), whether or not the imaging scene has been changed is determined, for example, in the following manner. When both the following conditions are met, it is determined that the imaging scene has not been changed.

(a) After determining an in-focus state in the last AF operation, no pan or tilt of the camera main body 200 has been detected.

(b) After determining an in-focus state in the last AF operation, no change has been entailed in the extracted motion vector within an in-screen AF area range.

A pan or a tilt of the camera main body 200 may be determined based on an output from the gyro sensor, etc. included in the sensor group 234 of the camera main body 200.

Turning back to FIG. 4, the description continues. In step S107, the CPU 216 obtains a result of the focal position calculation. Specifically, the focus detection circuit 222 sets up, for example, an approximation equation of a quadratic curve using the contrast evaluation values at three points close to the peak and the lens position of the focus lens. The focus detection circuit 222 calculates a lens pulse position as the focal position based on the obtained quadratic curve. The focus detection circuit 222 sends the calculated focal position to the CPU 216.

In step S108, the CPU 216 determines whether or not the focus limit function is on and the focal position calculated by the focus detection circuit 222 is within the limited range between the near-side focus limit and the far-side focus limit. If the focal position is within the focus limit range, or if the focus limit function is off, the processing flow advances to step S109.

In step S109, the CPU 216 causes the display 224 to display information indicating an in-focus state. In step S110, the CPU 216 moves the focus lens to the focal position calculated by the focus detection circuit 222. The contrast detection AF processing then ends.

In step S108, if it is determined that the focus limit function is on, and the calculated focal position is not within the focus limit range, the processing flow advances to step S111. In step S111, the CPU 216 causes the display 224 to display information indicative of an in-focus state not established. In step S112, the CPU 216 moves the focus lens to the focus limit position that is closer to the focal position calculated by the focus detection circuit 222. The contrast detection AF processing then ends.

<Phase Detection AF Processing>

Figure 6A:
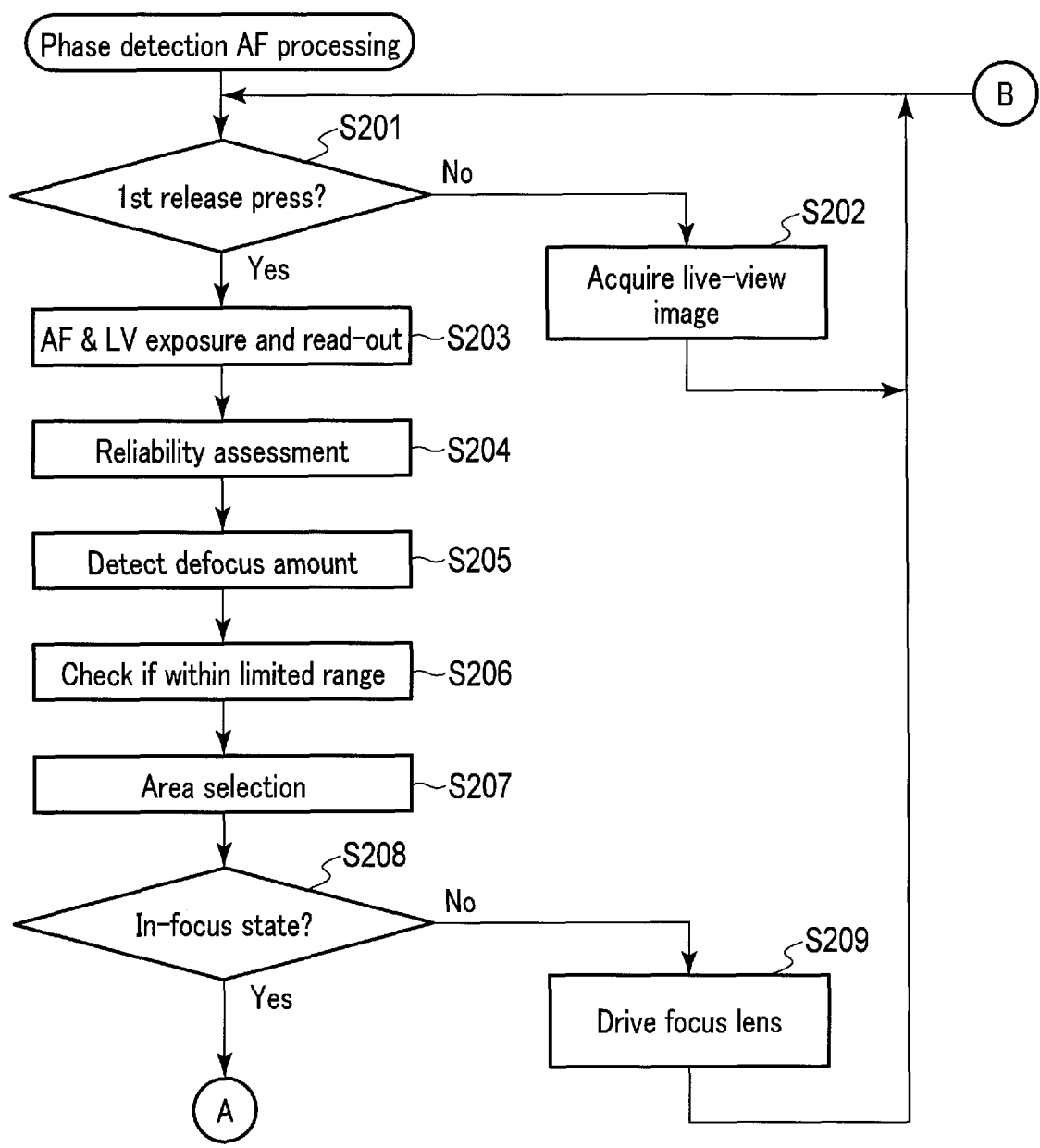
FIG. 6A is a flowchart schematically showing an example of phase detection AF processing according to one embodiment.
Figure 6B:
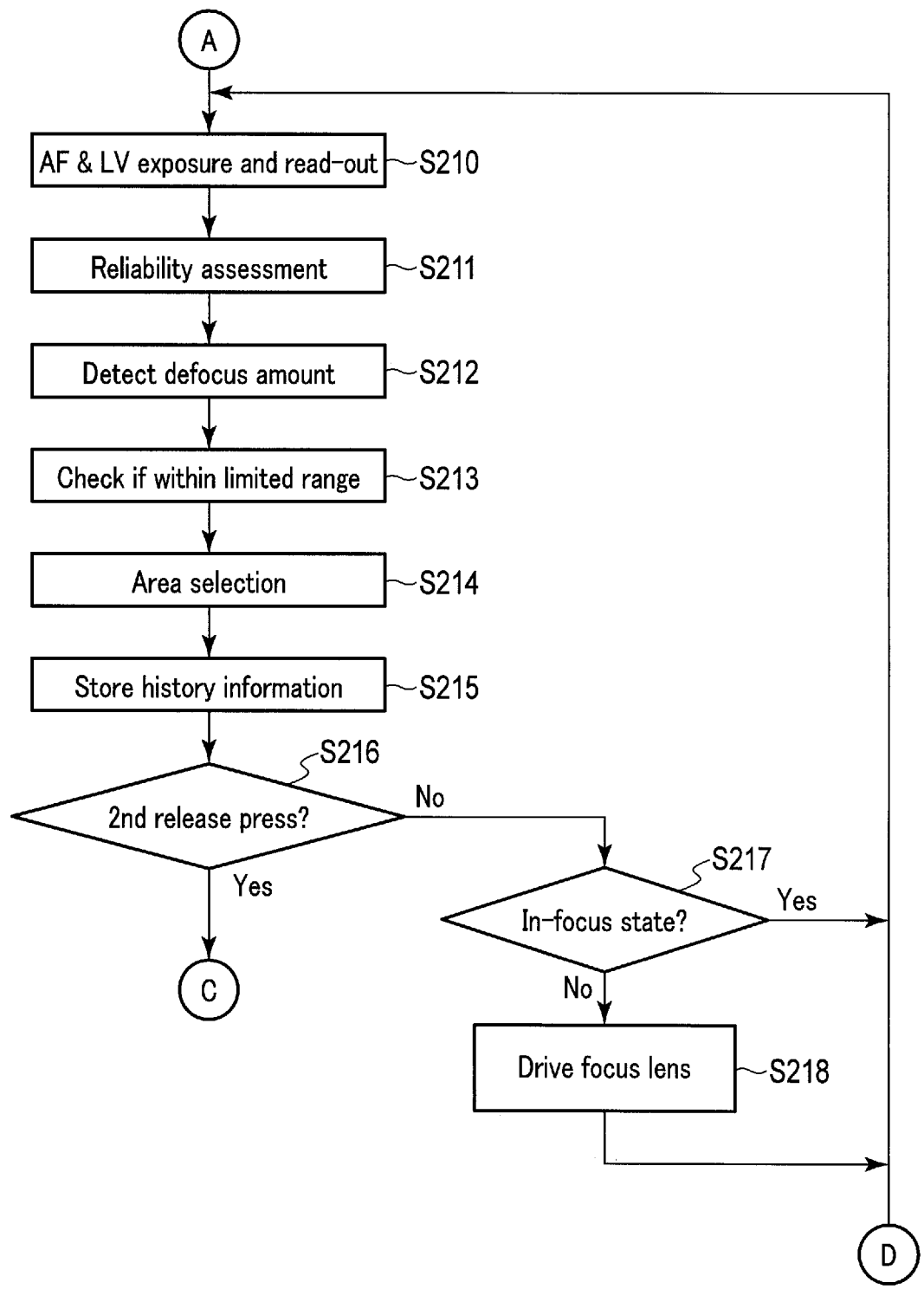
FIG. 6B is a flowchart schematically showing an example of phase detection AF processing according to one embodiment.
Figure 6C:
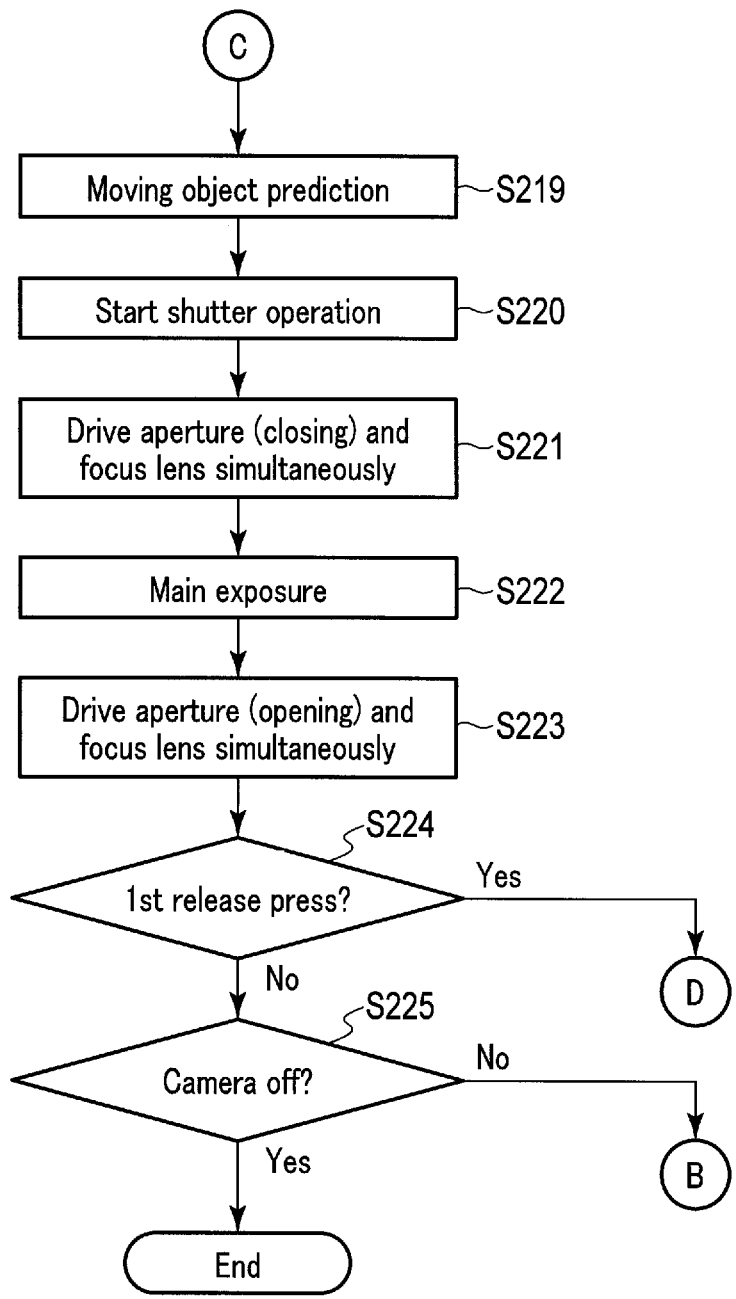
FIG. 6C is a flowchart schematically showing an example of phase detection AF processing according to one embodiment.

Operations of the camera system 1 in the phase detection AF mode will be described with reference to the flowcharts of FIGS. 6A to 6C. The operations shown in the flowcharts of FIGS. 6A to 6C are started when, for example, the camera main body 200 is turned on while the phase detection AF mode is selected or when the phase detection AF mode is selected while the camera main body 200 is on. Descriptions of the operations of sequentially shooting still images are being given, but the camera system 1 may also be adapted for other imaging operations such as taking moving images.

In step S201, the CPU 216 determines whether or not the 1st release press is done. If the 1st release press is not done, the processing flow advances to step S202.

In step S202, the CPU 216 acquires live-view image data. First, the CPU 216 switches over to the control signals for the driver 204 so that the mechanical shutter 202 is fully opened, together with instructing the lens CPU 116 to drive the aperture 106. Then, upon passage of a predetermined time for the aperture 106 to open and the mechanical shutter 202 to reach the full open condition, the CPU 216 starts a live-view exposure operation with the image sensor 208. The frame rate in this live-view exposure operation may be, for example, 60 fps. The acquired live-view image data undergoes live-view image processing in the image processor 218, and live-view images are displayed on the display 224. The processing flow then returns to step S201. That is, until the 1st release press, the processing repeats step S201 and step S202 to stand by with the live-view images displayed on the display 224.

If, in step S201, it is determined that the 1st release press is done, the processing advances to step S203. In step S203, the CPU 216 acquires AF image data or live-view image data. When acquiring AF image data, the CPU 216 causes the image sensor 208 to perform an AF exposure operation. The exposure time in the AF exposure operation may be differentiated from the exposure time in a live-view exposure operation. Also, in the AF exposure operation, pixel signals may be read from only the focus detection pixels. Upon acquiring the live-view image data, the processing as in step S202 is performed and the live-view images are displayed on the display 224.

According to this embodiment, a predetermined number of AF areas are set in an imaging range. As one example, the case will be assumed, where a total of 121 AF areas are arranged in 11 columns×11 rows. According to the embodiment, all the 121 AF areas will be subject to calculation of a focal deviation (defocus amount) in the vertical direction and the horizontal direction.

In step S204, the focus detection circuit 222 performs reliability assessment in which, for example, the following assessment is done for all the 121 AF areas while distinguishing the vertical portion and the horizontal portion in each of the AF areas. That is, the AF areas satisfying all the following conditions are determined to be reliable AF areas.

(1) Contrast for the output of the focus detection pixels is greater than a predetermined value.

(2) The local minimum value obtained as a result of a correlation operation is smaller than a predetermined value.

(3) The inclination formed between the local minimum value obtained as a result of the correlation operation and a greater one of the adjacent values obtained as a result of the correlation operations is larger than a predetermined value. The subsequent processing will be performed only on the AF areas assessed to be reliable AF areas.

In step S205, the focus detection circuit 222 detects a defocus amount. Specifically, the focus detection circuit 222 acquires the defocus amount [mm] for the AF areas assessed to be reliable, by multiplying a two-image interval value by a sensitivity value that differs for each AF area. The two-image interval value here is an image deviation amount representing the minimum correlation operation result. The focus detection circuit 222 further adds a contrast best-deviation-correcting amount of the lens 104 of the lens unit 100 to the defocus amount. This contrast best-deviation-correcting amount is a correction amount that differs for each AF, and virtually corresponds to the frequency aberration of the imaging lens.

The focus detection circuit 222 converts the thus-obtained defocus amount into a focus lens position (lens pulse position). This conversion is performed using, for example, an approximation equation showing the lens position with respect to a defocus amount. As the approximation equation, a cubic polynomial, etc. prepared in advance for the lens unit 100 may be employed, for example. In one exemplary cubic polynomial, the focal position Pf may be expressed using a current lens position Pnow and a defocus amount d, as:

$$Pf = Pnow + ad^3 + bd^2 + cd,$$

where a, b, and c are values uniquely defined for a state of the lens unit 100 based on the zoom value of the lens unit 100, the current lens position, etc. As such, the a, b, and c values may be stored in the form of a table in the lens-side storage 118, and the focus detection circuit 222 may perform calculation operations by reading this table.

In step S206, the focus detection circuit 222 checks whether or not the calculated focal position is within the limited range between the near-side focus limit and the far-side focus limit. If the focal position is not within the limited range, the CPU 216 removes the AF area from the processing subject.

Whether or not the focal position falls within the limited range is determined, for example, in the following manner. Using a current lens position Pnow, a defocus amount d, the aforementioned constants a, b, and c which correspond to the state of the lens unit 100, and a repetitive determination margin M, if either the relationship:

$$Pnow + \alpha(ad^3 + bd^2 + cd) < Plim\_f - M, \text{ or}$$

$$Pnow + \alpha(ad^3 + bd^2 + cd) > Plim\_n + M,$$

where Plim_f is a far-side focus limit position and Plim_n is a near-side focus limit position, is satisfied, the focal position is determined to be outside the limited range. The symbol α is a coefficient for avoiding erroneously detecting, when the defocus amount is large, that the focal position is outside the limited range. The symbol α may be set to, for example, a value around 0.9.

The repetitive determination margin M is preferably the same value as the repetitive determination margin M used in the contrast detection AF processing. That is, supposing that the range between the respective boundaries (Plim_f−M and Plim_n+M) in the phase detection AF processing is a first limited range, and the range between the respective boundaries (Plim_f−M and Plim_n+M) in the contrast detection AF processing is a second limited range, the first limited range and the second limited range conform with each other. Use of the common repetitive determination margin M in the contrast detection AF processing and the phase detection AF processing allows for an accurate and stable focus limit determination even when the AF schemes are switched.

In step S207, the CPU 216 performs area selection processing for selecting an AF area to set as a target of the focus lens position. The AF area selection may be based on, for example, selecting an AF area that represents the nearest-side focal position, selecting an AF area that has the highest reliability, selecting an AF area that is involved in moving object prediction, and so on. As one example, selecting the nearest-side focal position will be described for each of (1) a single target case, where one AF area among the aforementioned 121 AF areas will be targeted, (2) a group target case, where a plurality of AF areas among the 121 AF areas will be targeted, and (3) an all-target case, where all of the 121 AF areas will be targeted. Focusing on the nearest side means that an AF area having the largest defocus amount when compared in terms of a signed value, not an absolute value, is targeted for focusing.

(1) Single Target Case

The largest defocus amount in either the vertical portion or the horizontal portion of one AF area, whichever has been assessed to be reliable, is adopted.

(2) Group Target Case

An example of a group target including 9 subject AF areas is shown in FIG. 7. Specifically, FIG. 7 shows an AF subject region 611 in an image range 601. This AF subject region 611 is partitioned into 121 AF areas arranged in 11 columns× 11 rows. Among these AF areas, the example shown in FIG. 7 designates 9 AF areas surrounded by a frame 621 as a group target. FIG. 8 shows one example of a group target including 5 subject AF areas. Similar to FIG. 7, the example shown in FIG. 8 designates, among the 121 AF areas, 5 AF areas indicated by a frame 631 as a group target.

In the group target case, the largest defocus amount in the AF area, which belongs to the group target and which has been assessed to be reliable, is adopted.

(3) All Target Case

As shown in FIG. 9, in the all-target case, 25 AF areas located at the center and surrounded by a solid frame 641 are first targeted as subject AF areas among the 121 AF areas, to determine a defocus amount to be adopted. That is, the largest defocus amount in the AF area, which belongs to the 25 central AF areas and which has been assessed to be reliable, is adopted.

If none of the 25 central AF areas have been assessed to be reliable, then 49 central AF areas surrounded by a broken frame 642 in FIG. 9 are targeted as subject AF areas, to determine a defocus amount to be adopted. That is, the largest defocus amount in the AF area, which belongs to the 49 central AF areas and which has been assessed to be reliable, is adopted.

If none of the 49 central AF areas have been assessed to be reliable, all the 121 AF areas are targeted as subject AF areas, and a defocus amount to be adopted is determined. That is, the largest defocus amount in the AF area among the 121 AF areas, which has been assessed to be reliable, is adopted.

In step S208, the CPU 216 determines whether or not an in-focus state is established for the selected AF area. Whether or not the in-focus state is established is determined by, for example, determining whether or not the defocus amount is within a predetermined allowance. If the lens position does not conform to the focal position, the processing advances to step S209. In step S209, the CPU 216 instructs the lens CPU 116 so that the focus lens will be driven in accordance with the defocus direction and the defocus amount. In response to this instruction, the lens CPU 116 drives the lens 104 via the driver 114. The processing flow then returns to step S201. By repeating the processing described above, the lens position of the focus lens is adjusted and brought into the in-focus position.

The processing from step S201 to step S209 may therefore be regarded as processing from the 1st release press to the first establishment of the in-focus state.

If it is determined in step S208 that the lens position conforms to the focal position, the processing flow advances to step S210. In step S210, as in step S203, the CPU 216 acquires AF image data or live-view image data. In step S211, the focus detection circuit 222 performs reliability assessment as in step S204. In step S212, the focus detection circuit 222 detects a defocus amount as in step S205. In step S213, the focus detection circuit 222 checks whether or not the calculated focal position is within the limited range as in step S206. In step S214, the focus detection circuit 222 performs area selection processing as in step S207.

In step S215, the CPU 216 stores history information indicative of the relationship between the AF area and the defocus amount in the DRAM 228, for executing moving object prediction.

In step S216, the CPU 216 determines whether or not the release button formed as a 2-stage button is pressed all the way down, that is, whether or not a 2nd release press has been performed. If the 2nd release press is not done, the processing flow advances to step S217. In step S217, the CPU 216 determines whether or not the selected AF area is in an in-focus state. If the lens position conforms to the focal position, the processing flow returns to step S210, for keeping the lens position in the focal position. If it is determined in step S217 that the lens position differs from the focal position, the processing flow advances to step S218. In step S218, the CPU 216 moves the focus lens according to the defocus amount. The processing flow then returns to step S210.

The processing from step S210 to step S218 may therefore be regarded as processing after the once established in-focus state, for the camera system 1 to operate in order to maintain the in-focus state.

If, in step S216, it is determined that the 2nd release press is done, the processing flow advances to step S219. In step S219, the focus detection circuit 222 executes moving object prediction based on the history information that is indicative of the relationship between the AF area and the defocus amount and stored in the DRAM 228. That is, the focus detection circuit 222 predicts, based on the history information, to what position the focus lens should be driven this time.

In step S220, the CPU 216 causes the mechanical shutter 202 to start its operation for the main exposure for sequentially shooting still images. This operation of the mechanical shutter 202 includes opening and closing actions with the main exposure sandwiched therebetween, as well as a fully-open action for starting a live-view exposure operation or an AF exposure operation after the main exposure. In step S221, the CPU 216 instructs the lens CPU 116 to concurrently drive the lens 104 and the aperture 106. In this instance of step S221, the instruction is made so that the aperture 106 is driven to narrow down its opening diameter to a value that is predetermined by AE exposure amount calculation, etc. as a requisite for sequentially shooting still images.

In step S222, the CPU 216 starts the main exposure. The main exposure is an exposure process to acquire image data for recording. In the main exposure, the CPU 216 controls the driver 204 to open the mechanical shutter 202 for a predetermined exposure period required for sequentially shooting still images. The CPU 216 then starts the imaging operations of the image sensor 208 during the exposure period. After the exposure period, the imaging control circuit 210 reads pixel signals from each pixel in the image sensor 208. After reading the pixel signals, the image processor 218 performs processing for correcting the pixel outputs of the focus detection pixels and other processing for generating image data for recording. After the image processing, the image compression/expansion circuit 220 compresses the image data for recording. After the compression, the CPU 216 records the compressed image data in the recording medium 232 as an image file.

In step S223, the CPU 216 instructs the lens CPU 116 to concurrently drive the lens 104 and the aperture 106. In the instance of step S223, the instruction is made so that the aperture 106 is driven to open to an opening diameter (e.g., open aperture) required for live-view exposure or AF exposure.

In step S224, the CPU 216 determines whether or not the 1st release press is effective. If the 1st release press is effective, the processing returns to step S210. Accordingly, if the 2nd release press is currently continuing, the processing from step S210 to step S224 is repeated. The processing from step S210 to step S224 may therefore be regarded as processing during continuous shooting, for the camera system 1 to operate based on the moving object prediction in order to maintain the in-focus state.

If, in step S224, it is determined that the 1st release press is not effective, the processing advances to step S225. In step S225, whether or not the camera system 1 is turned off is determined. If the camera system 1 is not off, that is, if the camera system 1 is kept on, the processing returns to step S201. If the camera system 1 is turned off, the phase detection AF processing ends.

With the camera system 1 according to this embodiment, it is possible to realize a range for focal determination with accuracy, while minimizing the driving range of a focus lens in such a manner as to comply with specific settings of focus limit values. In the contrast detection AF processing, it is possible to accurately detect even a focal position close to the focus limits by performing scan-driving up to a position that is several frames beyond the focus limit values. In the phase detection AF processing, it is possible to realize a range for focal determination with accuracy, by determining an out-of-focus state if the focal position calculated from a defocus amount falls outside the limited range or outside the first limited range that considers a margin.

When the same imaging scene is continuing after establishing an in-focus state once, whether or not the focal position is outside the limited range is determined using a margin, and this can avoid an erroneous determination that the focal position is outside the limited range. For this margin, adopting a value common to the contrast detection AF and the phase detection AF allows for an accurate determination that does not vary depending on the difference in AF schemes.

By managing a distance in terms of pulse positions, and by controlling the focus limit operations from the camera main body 200 even in the case of setting focus limits in the lens unit 100, a consistent control is enabled under various circumstances.

Of the techniques having been described, the control described mainly by referring to the flowcharts may be realized by a program or programs. Such programs can be stored in a recording medium or a recording unit. The programs can be recorded in a recording medium or a recording unit in various ways. They may be recorded at the time of shipping products, they can be recorded using a distributed recording medium, or they can be downloaded from the Internet.

Additionally, the techniques may be applied to information portable terminals, such as smart-phones and tablet terminals. The information portable terminals include wearable terminals. Furthermore, the subjects of application are not limited to cameras, etc. for consumers, but the techniques are applicable to monitoring cameras, cameras for microscopes, industrial apparatuses for inspection, etc., and observation apparatuses for various medical purposes. While the descriptions of the embodiments have assumed that the sensors for detecting a phase difference are provided in the image sensor 208, a sensor for detecting a phase difference may, of course, be provided separately from the image sensor 208.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focusing device to control a focusing operation of a lens unit which moves a focus lens to adjust a focal position, the focusing device comprising:
   an operation device which receives an input indicative of a range for moving the focus lens as a limited range; and
   at least one circuit which controls a first focusing operation using a contrast detection scheme to obtain a focal position of the focus lens based on a contrast evaluation value of an object image, a second focusing operation using a phase detection scheme to obtain a focal position of the focus lens based on a defocus amount calculated from a phase difference, and a setting operation to set the limited range,
   wherein the at least one circuit is configured to,
      in the first focusing operation, obtain the contrast evaluation value for positions of the focus lens within the limited range and a predetermined range beyond the limited range, and control the focusing operation based on the obtained contrast evaluation value, and
      in the second focusing operation, determine an out-of-focus state if the focal position of the focus lens based on the calculated defocus amount is outside the limited range or outside a first limited range having a boundary outside the limited range,
   wherein the limited range is defined by both (1) a near-side limit within a nearest end and an infinite end of the lens and (2) a far-side limit within the nearest end and the infinite end of the lens, and
   wherein the near-side limit is a first lens extension pulse number and the far-side limit is a second lens extension pulse number.

2. The focusing device according to claim 1, wherein, in the first focusing operation, the at least one circuit is configured to determine an out-of-focus state if the focal position of the focus lens based on the contrast evaluation value is outside the limited range or outside a second limited range having a boundary outside the limited range.

3. The focusing device according to claim 1, wherein the at least one circuit is configured to
   determine an imaging scene, and
   upon determining that the imaging scene is continuing, set the boundary to further outside the limited range than in a case of determining that the imaging scene has been changed.

4. The focusing device according to claim 1, wherein the at least one circuit is configured to
   obtain position information indicative of a position of the focus lens, and calculate the limited range into a format conforming to the position information.

5. The focusing device according to claim 1 wherein the limited range is a range in which the focus lens is allowed to be positioned, resulting in that a range of the focal position is limited, and wherein the focal position is an in-focus position of the focus lens.

6. The focusing device of claim 1 wherein the first lens extension pulse number is derived from a first distance set by a user via a user interface, and the second lens extension pulse number is derived from a second distance set by the user via the user interface.

7. The focusing device according to claim 2, wherein the at least one circuit is configured to set the first limited range and the second limited range to conform with each other.

8. The focusing device according to claim 2, wherein the at least one circuit is configured to
determine an imaging scene, and
upon determining that the imaging scene is continuing, set the boundary to further outside the limited range than in a case of determining that the imaging scene has been changed.

9. The focusing device according to claim 2, wherein the at least one circuit is configured to
obtain position information indicative of a position of the focus lens, and
calculate the limited range into a format conforming to the position information.

10. A camera system comprising:
a camera main body comprising the focusing device according to claim 4; and
the lens unit,
wherein
the camera main body comprises
a first communication unit for connection to the lens unit,
the lens unit comprises
the focus lens,
a lens circuit which outputs information for designating the limited range,
a position detector which detects the position of the focus lens, and
a second communication unit for connection to the camera main body,
the camera main body and the lens unit are configured to exchange information via the first communication unit and the second communication unit, and
the at least one circuit of the focusing device obtains, via the first communication unit, the information for designating the limited range from the lens circuit and the position information from the position detector.

11. A focusing method for controlling a focusing operation of a lens unit which moves a focus lens to adjust a focal position, the focusing method comprising:
(i) determining a range for moving the focus lens as a limited range;
(ii) under a contrast detection scheme to obtain a focal position of the focus lens based on a contrast evaluation value of an object image, obtaining the contrast evaluation value for positions of the focus lens within the limited range and a predetermined range beyond the limited range, and controlling the focusing operation based on the obtained contrast evaluation value; and
(iii) under a phase detection scheme to obtain a focal position of the focus lens based on a defocus amount calculated from a phase difference, determining an out-of-focus state if the focal position of the focus lens based on the calculated defocus amount is outside the limited range or outside a first limited range having a boundary outside the limited range,
wherein the limited range is defined by both (1) a near-side limit within a nearest end and an infinite end of the lens and (2) a far-side limit within the nearest end and the infinite end of the lens, and
wherein the near-side limit is a first lens extension pulse number and the far-side limit is a second lens extension pulse number.

12. The focusing method of claim 11 wherein the limited range is a range in which the focus lens is allowed to be positioned, resulting in that a range of the focal position is limited, and wherein the focal position is an in-focus position of the focus lens.

13. The focusing method of claim 11 wherein the first lens extension pulse number is derived from a first distance set by a user via a user interface, and the second lens extension pulse number is derived from a second distance set by the user via the user interface.

* * * * *